Oct. 26, 1971     J. A. BOTT     3,615,069
LOAD SUPPORTING SLAT FOR LUGGAGE RACK OR THE LIKE
Filed May 8, 1969
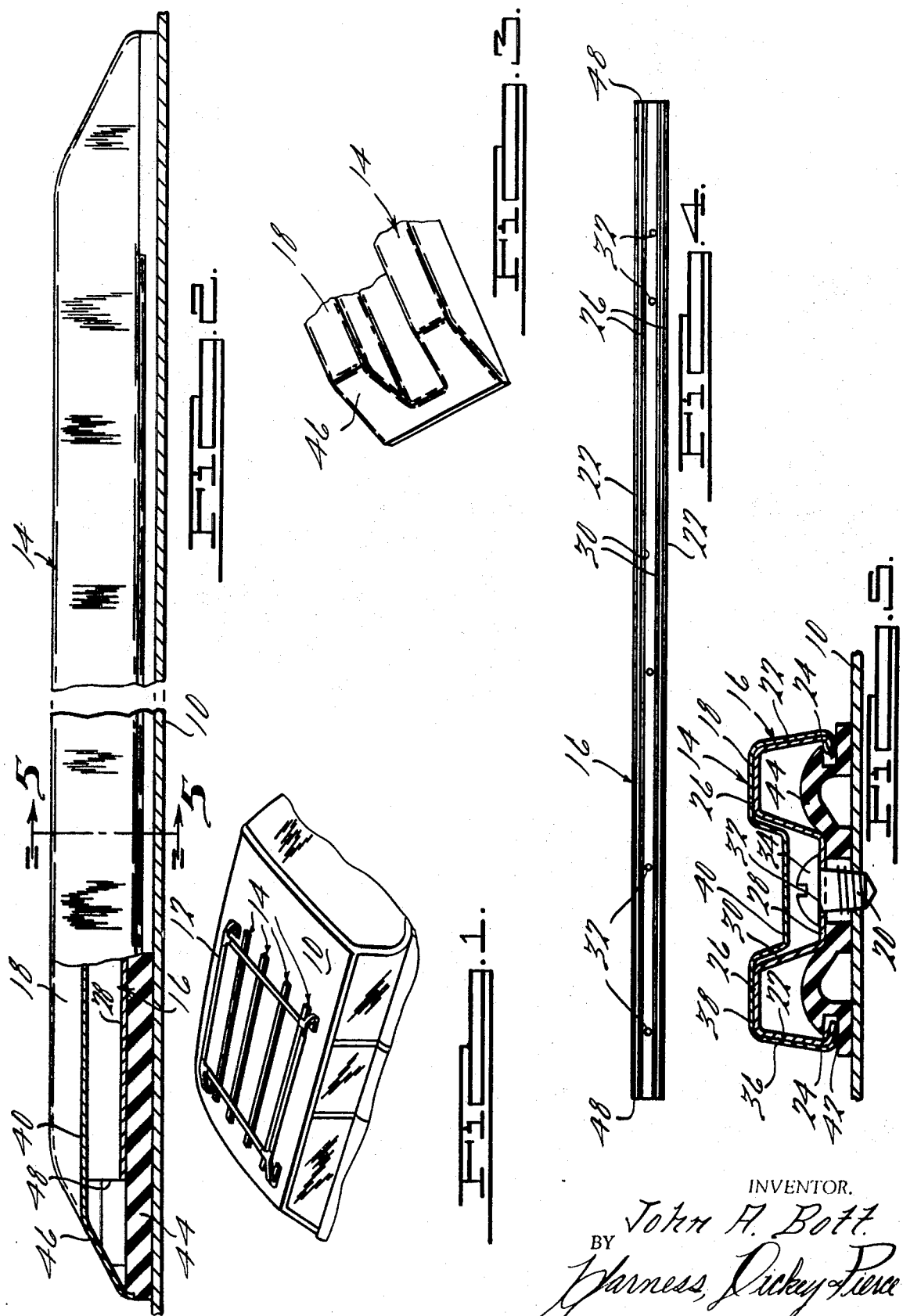
INVENTOR.
John A. Bott
BY Harness, Dickey & Pierce
ATTORNEYS United States Patent Office 3,615,069
Patented Oct. 26, 1971

3,615,069
LOAD SUPPORTING SLAT FOR LUGGAGE
RACK OR THE LIKE
John A. Bott, 931 Lake Shore Drive,
Grosse Pointe Shores, Mich. 48236
Filed May 8, 1969, Ser. No. 822,940
Int. Cl. F16m 11/00
U.S. Cl. 248—350                                               1 Claim

ABSTRACT OF THE DISCLOSURE

A two-piece slat for supporting luggage, or the like, on an automobile body. A plurality of such slats are used to define the bed of an automobile luggage rack. The construction of each slat includes a supporting rail fastened to the automobile body and a molding covering the rail. The rail is provided with various holes adapted to receive fasteners for securing the rail to a given automobile body with only a selected number of such holes being used at any one time. The molding is snap-fitted over the supporting rail and covers all the holes therein and the fasteners. The molding is made from relatively thin stainless steel while the rail is made from heavier galvanized steel. The molding possesses an attractive bright appearance and completely covers the rail and its fasteners while at the same time protecting the luggage from sharp corners, or the like, on the rail and the fasteners.

SUMMARY OF THE INVENTION

The load supporting slats which are used in connection with automobile luggage racks are normally secured to the roof of a vehicle by means of fasteners extending through holes therein. The fasteners must, however, be inserted into the roof of the vehicle in selected reinforced locations. However, the reinforced locations suitable for receiving fasteners vary from one vehicle to another. For this reason it has been necessary to utilize different slats having fastener receiving openings in different locations for the luggage racks which are adapted to be used on different vehicles.

The luggage rack of the present invention is characterized by the use of a two-part construction including a concealed supporting rail or retainer having all of the fastener receiving openings necessary for its installation on several different vehicles. For example, the rail may have five or six openings therein even though only two or three fasteners are used to secure the rail to the roof of the vehicle body. The particular openings through which the fasteners are installed will depend upon the vehicle on which the slat is fitted. A molding is resiliently fitted over the rail and covers all of the fastening receiving openings and the fasteners, and provides the slat with an attractive appearance that is unmarked by screw heads or the like. It is unnecessary for a manufacturer to stock different slats for different cars and a single slat can be used on several different vehicle bodies.

The molding which is utilized in the slat construction of the present invention may be made from stainless steel, a relatively high priced material. However, relatively thin stock may be used for the molding as it is conformably engaged and supported in selected locations by the rail over which it is fitted. The rail is made from low cost yet heavy duty galvanized steel and it reinforces the molding and provides it with the necessary structural strength. The unattractive appearance of the rail is concealed by the molding, which completely covers the rail. The rail is first installed on the vehicle and thereafter the molding is pressed onto the rail so as to cover the rail and its fasteners.

The two-part slat construction of the present invention possesses a low cost; it is relatively easily installed on a vehicle; is adapted for use on different vehicles; it is highly attractive in appearance; it is reliable and durable in use; and it properly protects the luggage carried thereon as well as the vehicle from damage. These and other advantages of the present invention will become apparent from the following detailed description taken in conjunction with the accompanying drawings.

DESCRIPTION OF THE ILLUSTRATED VIEWS OF THE INVENTION

FIG. 1 is a perspective view of an automobile roof showing a plurality of slats of the present invention mounted thereon;

FIG. 2 is an enlarged side elevational view partly in section of one of the slats shown in FIG. 1;

FIG. 3 is a perspective view of a part of the structure shown in FIG. 2;

FIG. 4 is a plan view on a reduced scale of a part of the structure shown in FIG. 2; and FIG. 5 is a sectional view of the structure illustrated in FIG. 2, taken along the line 5—5 thereof.

DETAILED DESCRIPTION OF THE PREFERRED EMBODIMENT

FIG. 1 illustrates an automobile roof 10 having a luggage rack 12 fastened thereto. Disposed within the projected area of the luggage rack 12 are a plurality of parallel slats 14 fastened to the automobile roof 10. The present invention is concerned with the construction of the slats 14.

Each of the slats 14 consists of two parts: a supporting rail 16 and a moulding 18. The supporting rail 16 is made from an elongated continuous strip of metal which is rollformed to a uniform cross-sectional configuration illustrated in FIG. 4. The rail 16 is secured to the vehicle roof 10 by means of fasteners 20 in the form of sheet metal screws. The molding 18 is fitted over the rail 16 so as to be mechanically locked thereon. The molding 18 completely covers the rails 16 and the fasteners 20 to conceal the same from view.

The rail 16 is provided with a pair of downwardly and outwardly inclined flat outer supporting walls 22 on the opposite sides thereof. Each of the side walls 22 terminates at its lower end in an inwardly turned lip 24. The upper ends of the side walls 22 are joined to a pair of spaced coplanar ledges 26. The ledges 26 lie on opposite sides of a depressed central wall 28 which is connected to the ledges 26 by downwardly and inwardly inclined flat inner supporting walls 30. The central wall 28 has a plurality of openings 32 for the reception of the fasteners 20. The fasteners 20 have heads 34 which bear against the wall 28 around the openings 32.

The molding 18 which is fitted over the rail 16 includes side walls 36 conformably engageable with the side walls 22 of the rail and ledges 38 conformably engageable with the ledges 26 of the rail. Located between the ledges 38 is a depressed central wall 40 of the molding 18 which is spaced above the central wall 28 of the rail by an amount in excess of the height of the heads 34 of the screw fasteners 20. The lower ends of the folding side walls 36 terminate in inwardly and downwardly inclined lips 42 which engage the lips 24 of the rail 16. It will be noted that the free ends of the lips 24 are spaced apart a distance slightly greater than the distance between the upper ends of the side walls 22. This permits the molding 18 to be assembled onto the rail 16 by pressing downwardly on the molding after it is positioned over the rail. This action will wedge the lower ends of the molding side walls 36 apart so that the lips 42 will ride down the side walls 22 of the rail 16 and snap over the lower ends around the lips 24. By this means the molding 18 is mechanically locked onto the rail 16 and is held under tension with the molding walls 36 resiliently gripping the rail side walls 22 and thereby preventing any rattling or play between the molding and the rail.

The entire slat assembly 14 sits on a mounting pad 44 which is suitably apertured and notched to receive the slat assembly. It will be noted that the positioning of the molding 18 on the rail 16 completely conceals the rail 16 as well as the fasteners 20. The molding 18 is provided with end portions 46 at its opposite ends which are downwardly tapered to close the molding at the opposite ends thereof. In contrast, the rail 16 terminates in an abrupt end wall 48. Accordingly, the molding 18 serves to cover up any sharp corners or the like on the rail 16 and thereby protects the luggage which is positioned on the slat.

Both the molding 18 and rail 16 are desirably formed from flat sheet material on conventional roll-forming machinery. In addition, the molding 18 is subjected to an end forming process to form its end portions 46. This end forming is accomplished in a conventional die press. The material of which the molding 18 is formed is substantially thinner than the material from which the rail 16 is formed. For example, the molding 18 may be formed from stainless steel having a thickness of .015 of an inch; whereas, the rail 16 may be formed from galvanized steel having a thickness of .020 of an inch. The molding 18 is sufficiently thin that, by itself, it might collapse under the weight of heavy luggage positioned thereon. However, the continuous rail 16 underlying the molding 18 serves to reinforce the molding and support it against deformation. The material of the rail 16, being less expensive than the material of the molding 18, such reinforcing and strengthening of the molding is accomplished at a minimum of cost.

It will be apparent that in the installation of a slat 14 on the vehicle roof 10, the rail 16 is first placed on the pad 44 and secured in place by the fasteners 20. Thereafter, the molding 18 is manually pressed down on the rail so that its side walls 36 are spread apart by the side walls 22 of the rail and until the molding lips 42 snap under the lips 24 of the rail. By this means the molding 18 is held onto the rail 16 without the necessity of drilling any holes therein or utilizing exposed fasteners which would detract from the appearance of the slat 14. The openings 32 are so located in the rail wall 28 as to align with the appropriate areas of the vehicle roof 10 which are designed to receive the fasteners 20. A large number of openings 32 may be formed in the wall 28 whereby the rail is adapted for use on different vehicles. Only several of the openings 32 are used at any one time with the remaining holes being covered by the molding 18.

What is claimed is:

1. A load supporting slat construction for use on an automobile body or the like, including an elongated continuous rail formed from sheet metal and having a pair of laterally spaced flat ledges disposed in a common horizontal plane, a central horizontal wall located between and beneath said ledges and having a plurality of fastener receiving apertures therein, a pair of inner supporting walls extending downwardly from the inner edges of said ledges to said central wall and a pair of outer supporting walls extending downwardly from the outer edges of said ledges; an elongated continuous molding fitted over said supporting rail and covering the openings thereof, said molding having wall portions conformably engaging said ledges and on which luggage, or the like, is adapted to rest, said molding having opposite side walls provided with lips at the lower ends thereof lockingly engaging said rail outer supporting walls; and a mounting pad on which said rail rests and to which the load of an object resting on said molding walls is transferred through both said inner supporting and said outer supporting walls, said mounting pad being provided with notches at the opposite sides thereof receiving said lips.

References Cited
UNITED STATES PATENTS

| | | | |
|---|---|---|---|
| 1,724,601 | 8/1929 | Kellogg | 52—718 |
| 2,681,716 | 6/1954 | Black | 52—718 |
| 3,120,914 | 2/1964 | Smith | 224—42.1 E |
| 3,246,440 | 4/1966 | Meyer | 52—718 |
| 3,253,755 | 5/1966 | Bott | 224—42.1 E |

GERALD M. FORLENZA, Primary Examiner

L. J. ORESKY, Assistant Examiner

U.S. Cl. X.R.

224—42.1 D